(12) United States Patent
Ouriev et al.

(10) Patent No.: US 8,585,393 B2
(45) Date of Patent: Nov. 19, 2013

(54) DEVICE FOR CASTING EDIBLE PRODUCTS

(75) Inventors: Boris Ouriev, Niederuzwil (CH); Ralf Bömmels, Zürich (CH)

(73) Assignee: Bühler AG, Uzwil (CH)

( * ) Notice: Subject to any disclaimer, the term of this patent is extended or adjusted under 35 U.S.C. 154(b) by 845 days.

(21) Appl. No.: 12/601,159

(22) PCT Filed: Apr. 3, 2008

(86) PCT No.: PCT/CH2008/000149
§ 371 (c)(1),
(2), (4) Date: Mar. 23, 2010

(87) PCT Pub. No.: WO2008/141468
PCT Pub. Date: Nov. 27, 2008

(65) Prior Publication Data
US 2010/0291269 A1   Nov. 18, 2010

(30) Foreign Application Priority Data

May 22, 2007  (DE) .......................... 10 2007 024 028

(51) Int. Cl.
*A23G 1/20* (2006.01)
*A23G 1/22* (2006.01)

(52) U.S. Cl.
USPC ........... 425/449; 137/849; 141/260; 222/162; 222/321.6; 222/380; 222/387; 222/490; 222/494; 222/511; 222/636

(58) Field of Classification Search
USPC ............... 137/849; 222/162, 321.6, 380, 387, 222/490, 494, 511, 636; 141/258, 260; 425/449
See application file for complete search history.

(56) References Cited

U.S. PATENT DOCUMENTS

| | | | |
|---|---|---|---|
| 3,537,386 A | | 11/1970 | Grosbard |
| 3,759,425 A | * | 9/1973 | Lee ............................... 222/309 |
| 5,265,654 A | * | 11/1993 | Larsen ........................... 141/83 |
| 5,429,276 A | * | 7/1995 | Esclar et al. .................. 222/136 |
| 2007/0295753 A1 | * | 12/2007 | Vangeel et al. ............... 222/163 |

FOREIGN PATENT DOCUMENTS

| | | |
|---|---|---|
| DE | 3107808 | 9/1982 |
| DE | 29905283 | 6/1999 |
| EP | 0066756 | 12/1982 |
| EP | 0610724 | 8/1994 |
| EP | 1870008 A1 * | 12/2007 |
| WO | 01/78966 | 10/2001 |

* cited by examiner

*Primary Examiner* — Robert B Davis
(74) *Attorney, Agent, or Firm* — Shoemaker and Mattare

(57) ABSTRACT

An edible product is made from a castable mass such as chocolate in a casting device that includes a container for receiving the castable mass and a metering unit. The metering unit has a nozzle block having nozzles facing away from the container and a valve block facing the container. The volume of a metering chamber between the nozzle block and the valve block can be changed by moving the nozzle block relative to the valve block. The casting method comprises steps of a) filling the mass container with the castable mass; b) drawing the mass into the metering chamber by enlarging the metering chamber volume by a first relative motion between the nozzle block and the valve block, and c) discharging the mass from the metering chamber by reducing the metering chamber volume by a second relative motion between the nozzle block and valve block.

28 Claims, 12 Drawing Sheets

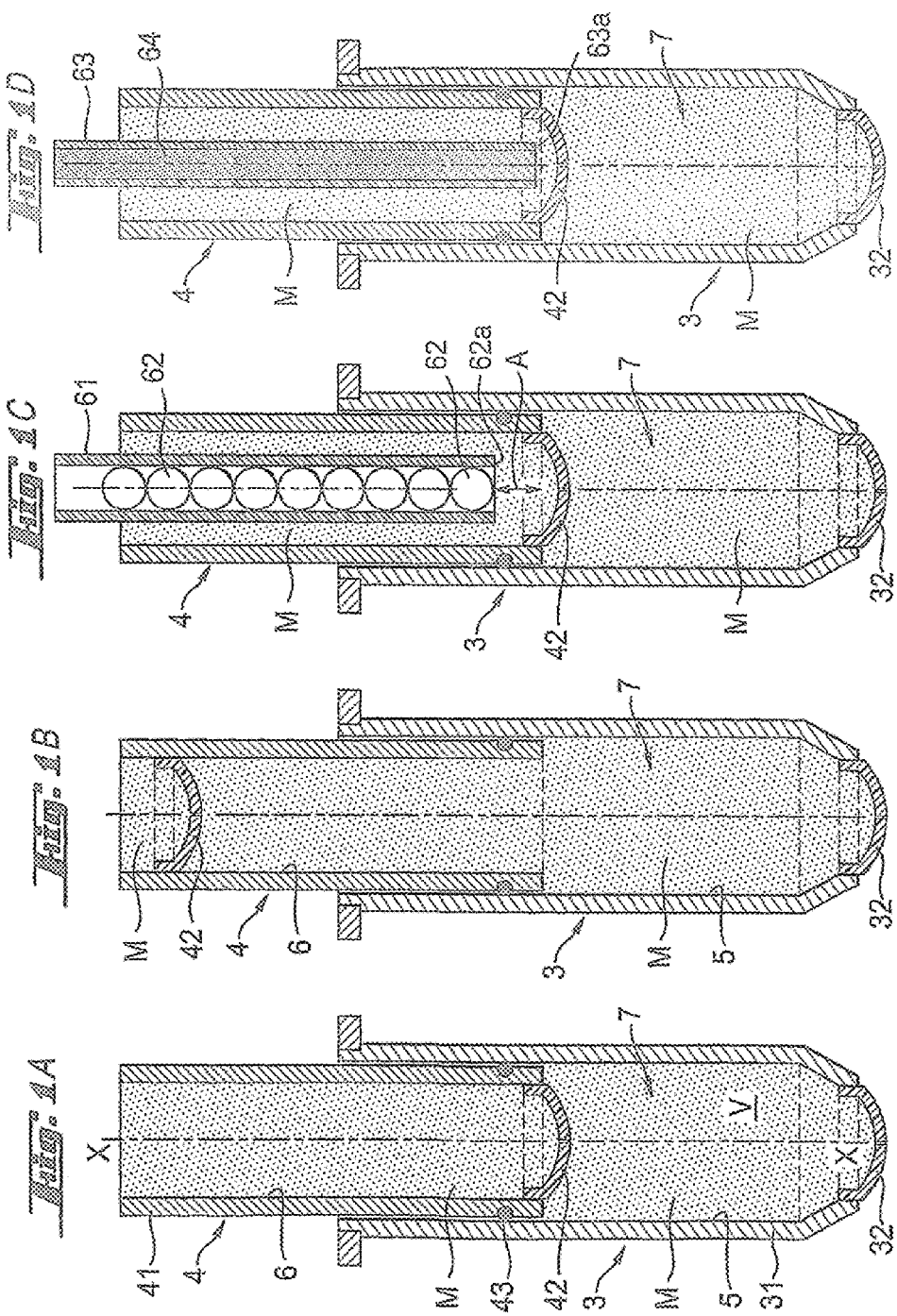

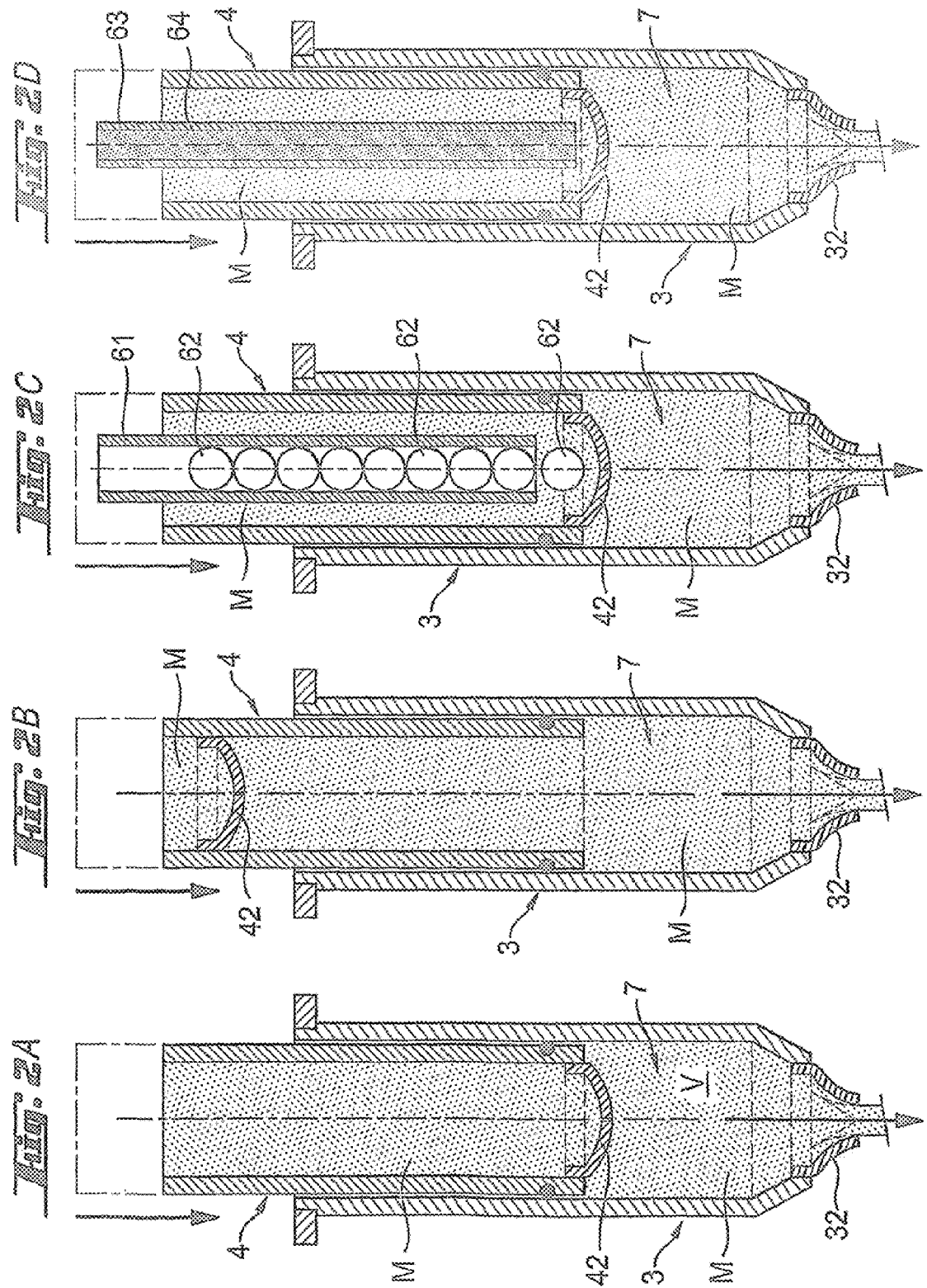

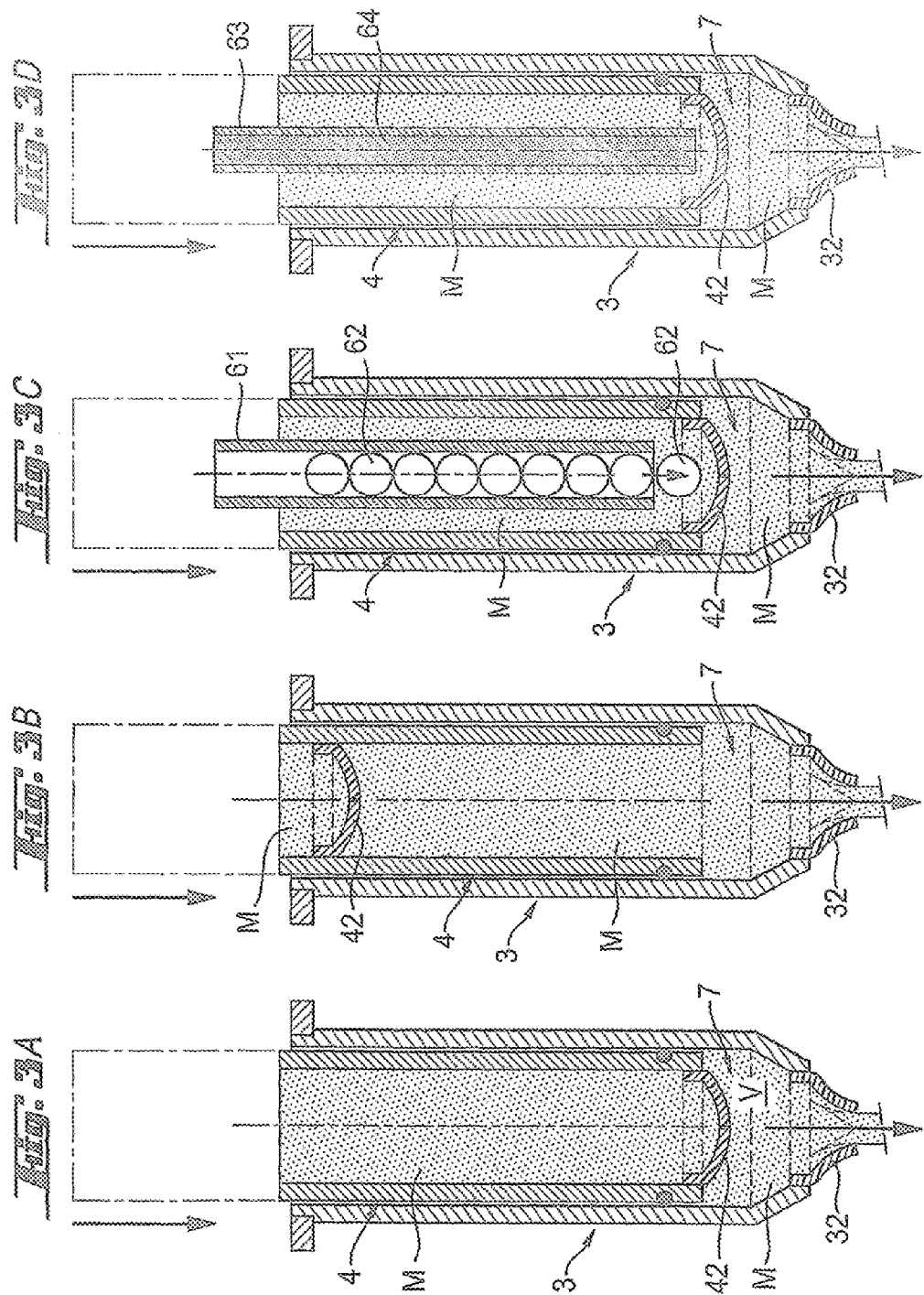

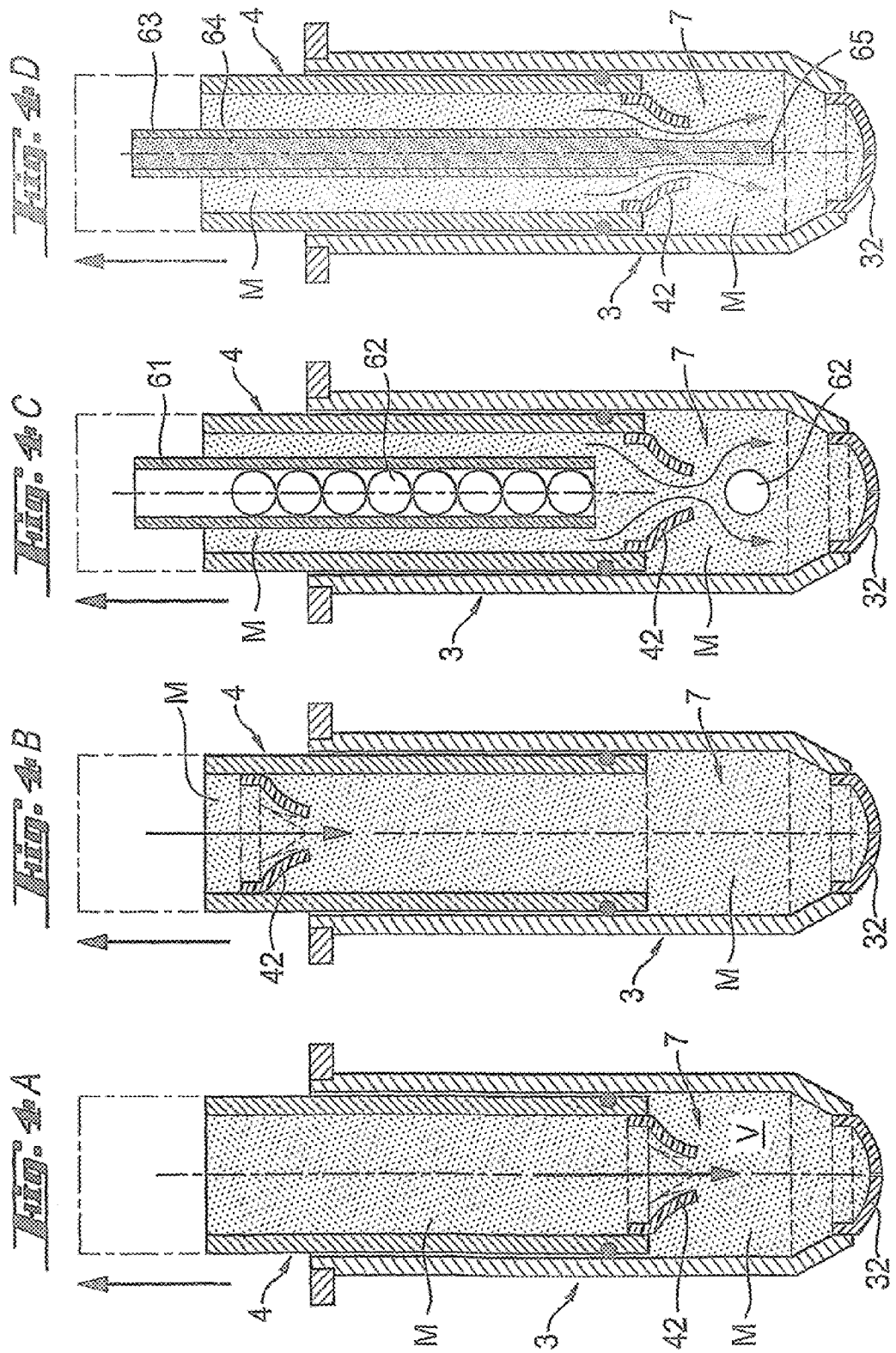

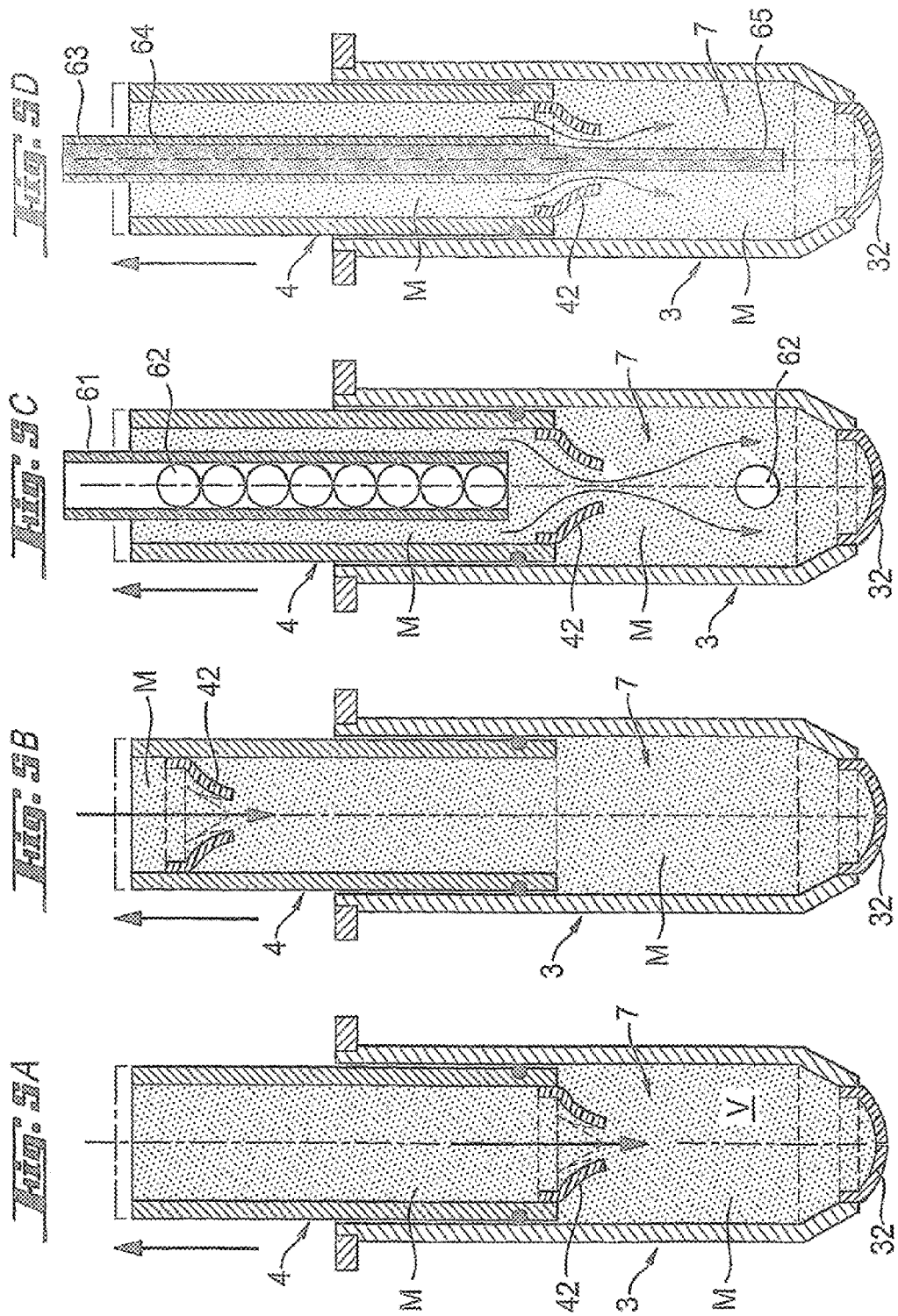

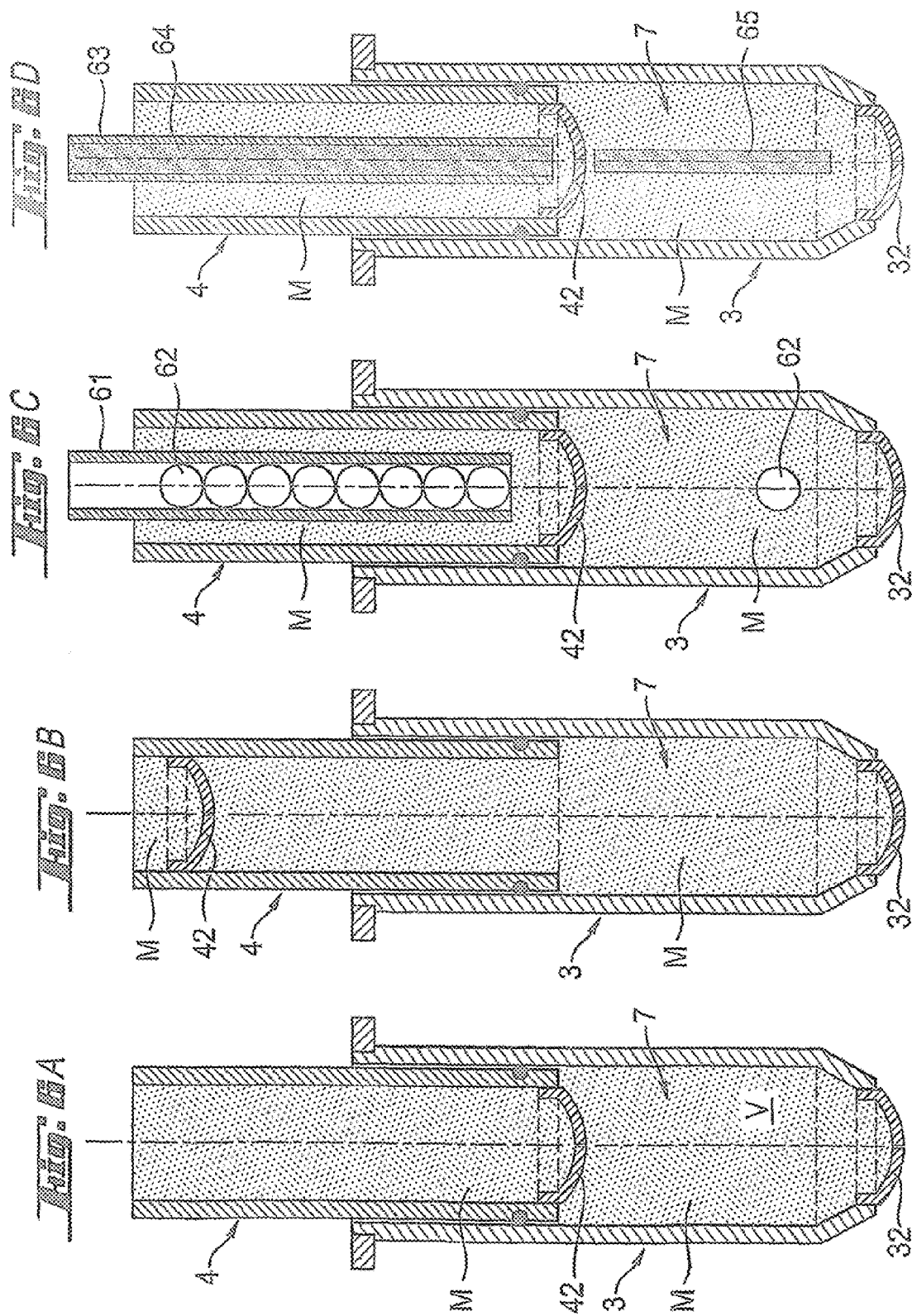

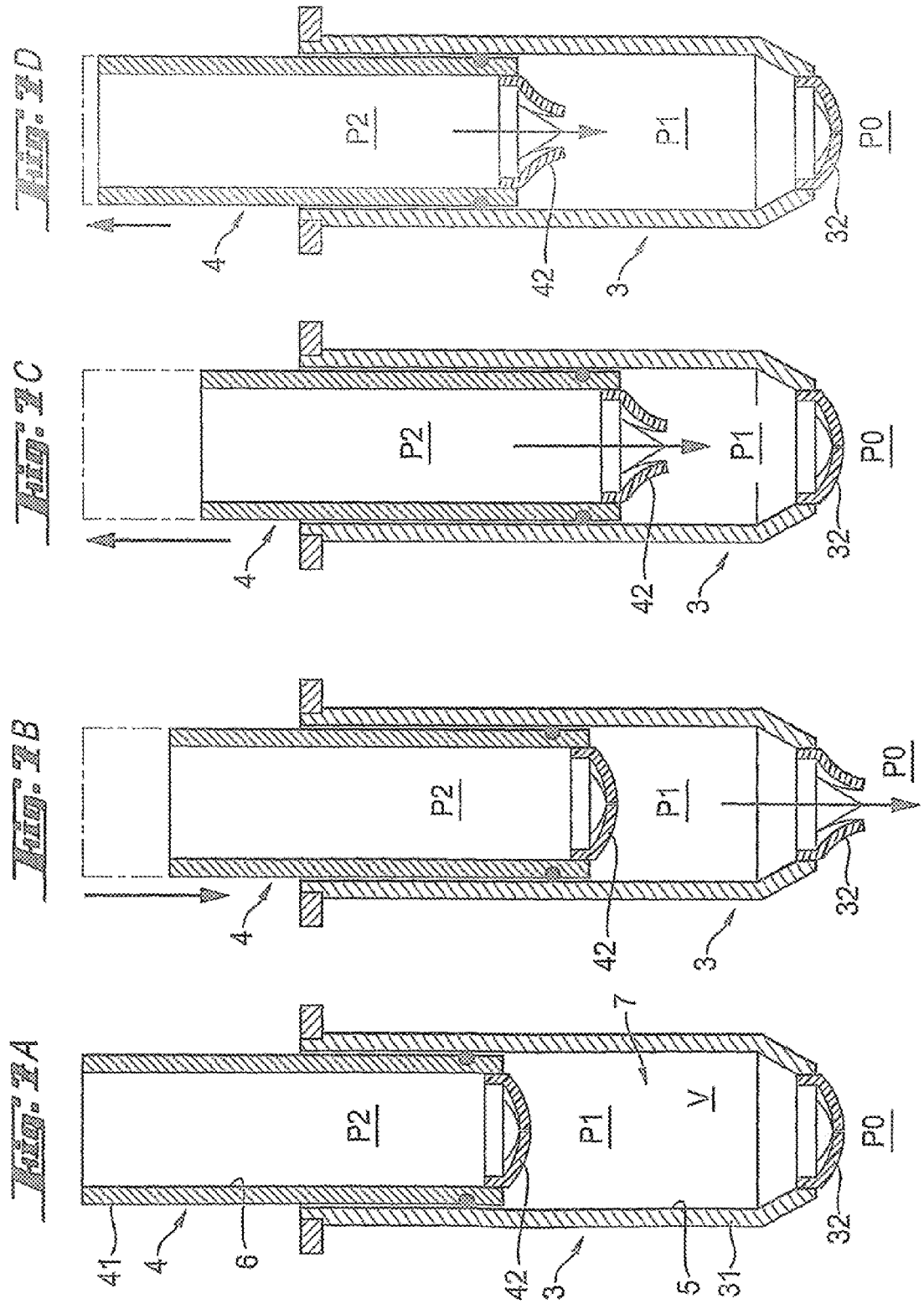

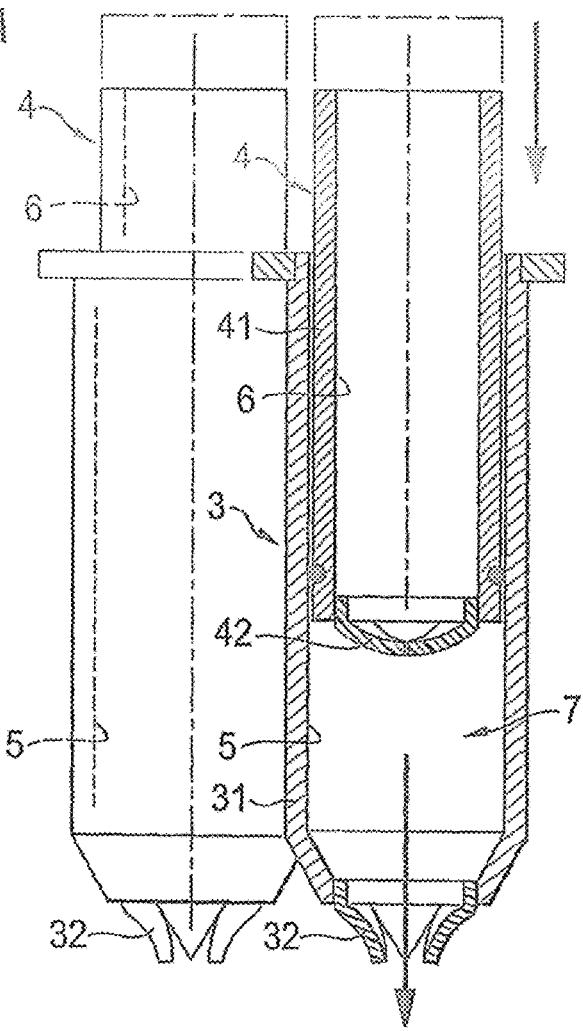
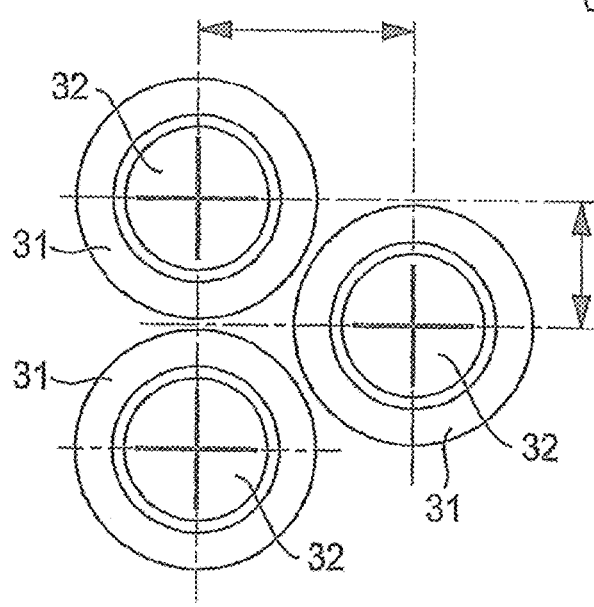

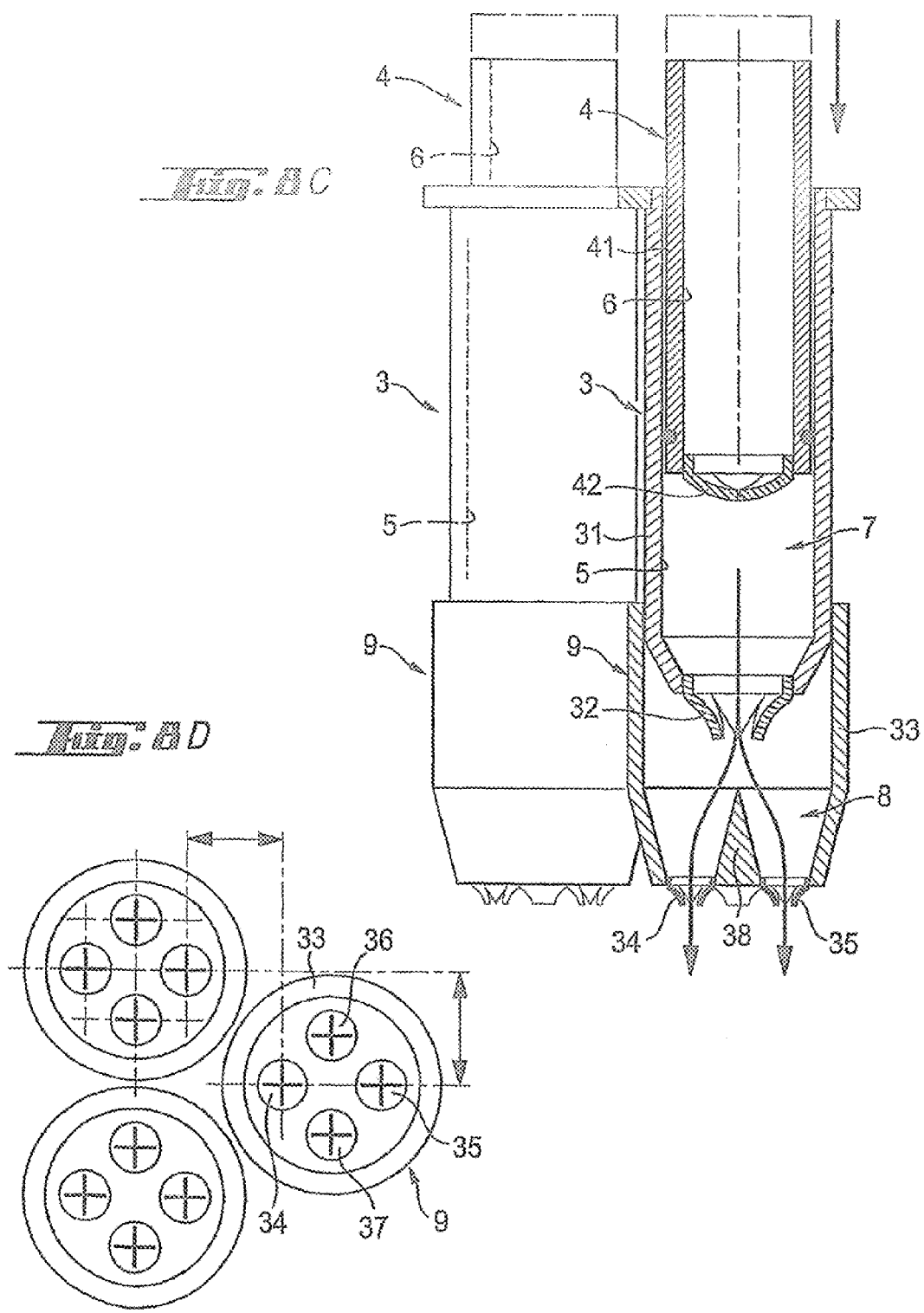

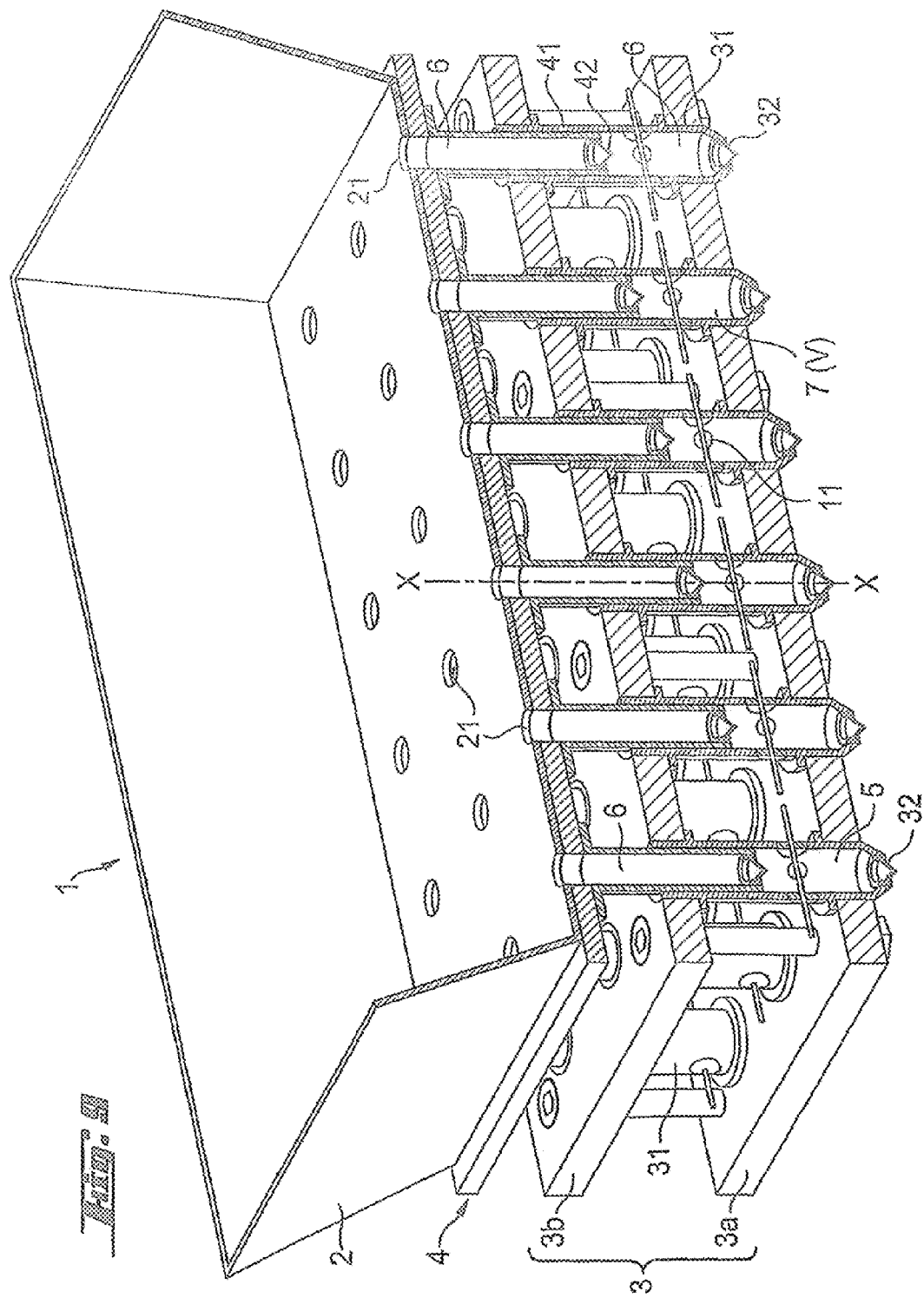

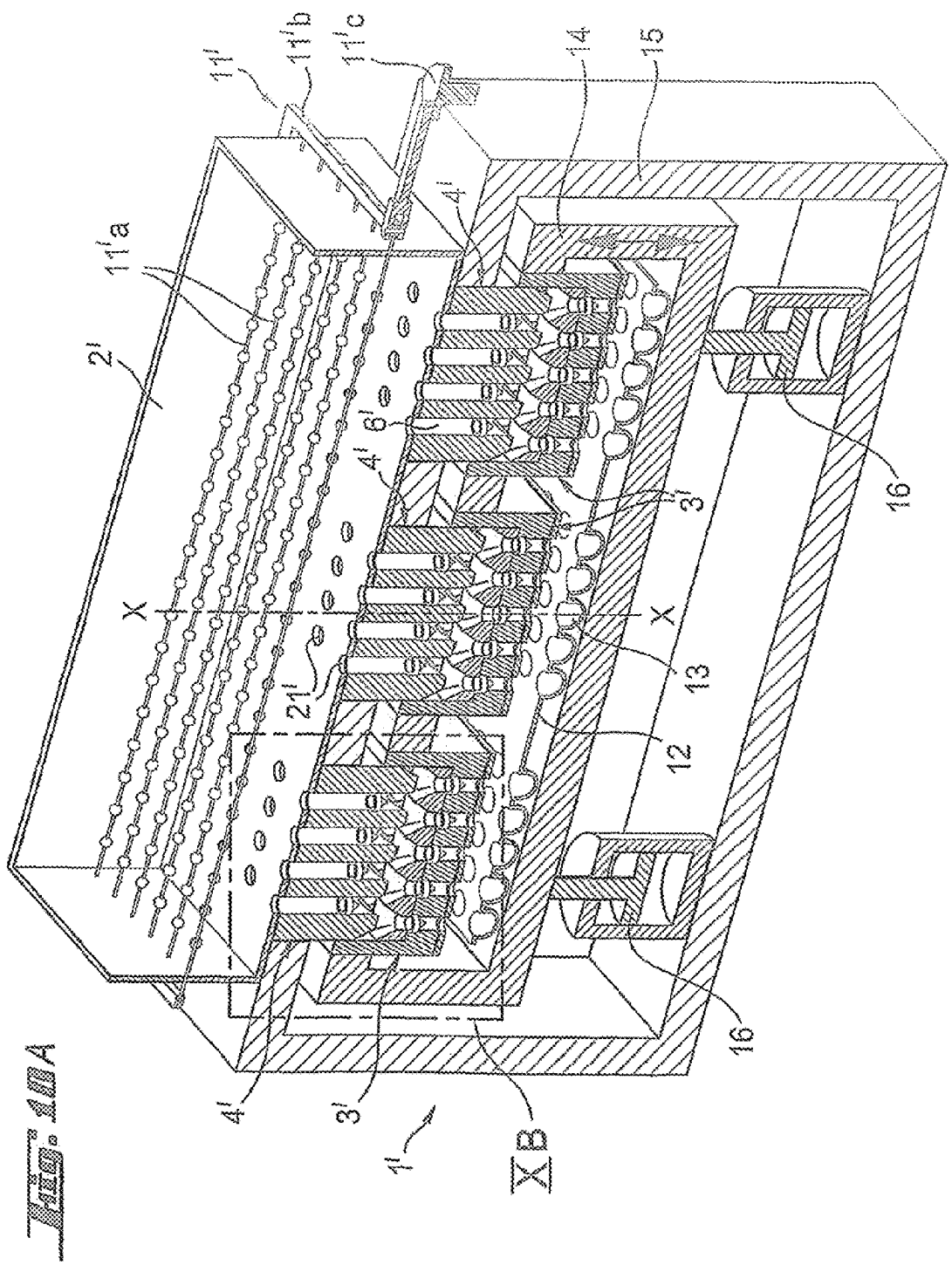

DEVICE FOR CASTING EDIBLE PRODUCTS

The invention relates to a device for casting edible products from a castable mass, in particular a fat mass such as chocolate.

Such casting machines contain a mass container for holding the castable mass, and a metering unit having nozzles which have a fluidic connection to the interior of the mass container.

In practice, the components of such casting machines are composed of rigid metal parts. The mass container serves to hold the castable mass. Lines which each open into one of a plurality of chambers, in each of which a piston can be moved, lead away from the base of said mass container. Each of the chambers is connected at the other end to one nozzle in each case. A valve function is provided for each chamber/piston/nozzle unit.

In an intake stroke, the respective valve opens the respective connecting line between the mass container and the respective chamber, while the respective connecting line between the respective chamber and the respective nozzle is blocked. The respective piston then moves in the chamber in such a way that the free chamber volume becomes larger and mass is sucked into the respective chamber.

In an expulsion stroke, the respective valve closes the respective connecting line between the mass container and the respective chamber, while the respective connecting line between the respective chamber and the respective nozzle is opened. The respective piston then moves in the chamber in such a way that the free chamber volume is made smaller and mass is pumped out of the respective chamber and to the respective nozzle.

The mass which is discharged from the nozzle is then pressed or cast onto a surface or into a mold.

In some special molds of such casting machines, the valve function is coupled to the piston function. For this purpose, the piston is embodied, for example, as an essentially cylindrical reciprocating rotary piston which can carry out, on the one hand, a reciprocating movement in the cylinder chamber along the axis of the chamber or of the piston and, on the other hand, a rotational movement about the axis of the chamber or of the piston. A special arrangement of the junctions of the connecting lines in the respective chamber wall and corresponding cutouts and/or passages in the respective piston permit a complete casting cycle (sucking in+expelling) to be carried out through a sequence of reciprocating and rotational movements of the respective piston in a first direction and in an opposing second direction.

Even if the number of movable parts could be somewhat reduced in the last-mentioned, more compact designs of such casting machines by combining the piston and valve functions, such conventional casting machines would still have a large number of moving parts.

Furthermore, in many cases, it is not possible to prevent subsequent flowing out of the nozzle at the end of the expulsion stroke when casting low viscosity masses. In most applications in which chocolate mass is cast, the casting takes place at such high temperatures that at least the crystal modifications of the triglycerides which melt at relatively low temperatures are melted, with the result that the chocolate mass as a whole is present in an extremely low viscosity state and subsequent flowing occurs at the nozzles.

Since small quantities are generally cast per casting cycle, almost the entire casting process takes place in the transient (non-steady-state) mode. However, in addition to the above-mentioned subsequent flowing and the metering deviations which are at least also caused by this, the casting which predominantly takes place in the transient range also leads to structural changes in the mass. This can lead to adverse effects on the quality of the cast chocolate masses.

Furthermore, given predefined production capacities (clocking frequency and metering quantity per clock cycle), it is virtually impossible to influence the time profile of the flow resistance which is caused by the flow properties (viscosity) of chocolate mass which is to be cast and by the geometric peripheral conditions.

The absolute pressure which acts on the upstream side of the nozzle has to be sufficiently large to overcome the flow limit of the chocolate mass to be cast at the start of the casting. This causes this pressure to rise strongly at first. As soon as the flowing starts, a much lower pressure is required to maintain further constant flowing. In addition, owing to the laminar shearing flow which now flows with a parabola-like flow profile, there is a change in the flow properties (viscosity) of the chocolate mass with the effect of decreasing the viscosity. The shearing therefore has a viscosity-reducing effect. The pressure which is required at the beginning to overcome the flow limit of the chocolate mass is therefore much larger than the pressure required to maintain the flowing after the start of the flowing. However, the configuration of the pressure sources and the stability of many machine parts have to be tailored to this maximum pressure requirement.

The invention is therefore based on the object of making available a casting machine for manufacturing an edible product from a castable mass, in particular from a fat mass such as chocolate, in which the described disadvantages and inadequacies during casting can be avoided or at least reduced. At the same time, the casting machine is to have a simple design which is not susceptible to faults.

This object is achieved by means of the invention by virtue of the fact that in the casting device described at the beginning the metering unit has, on the side facing away from the mass container, a nozzle block with nozzles, and on the side facing the mass container has a valve block with at least one valve, wherein a metering chamber with a metering chamber volume which can be changed via a relative movement between the nozzle block and the valve block is delimited between the nozzle block and the valve block.

The blockwise configuration of the metering unit according to the invention and the blockwise movement of the valve block relative to the nozzle block permit simple design and operation of the inventive metering unit and casting machine.

The mass container volume expediently has a fluidic connection to the metering chamber volume via at least one valve in the valve block, wherein the valves are open in the direction pointing from the mass container to the metering chamber, and are closed in the direction pointing from the metering chamber to the mass container. On the one hand, this permits the volume of the metering chamber to be enlarged, and therefore mass to be sucked into the metering chamber via the at least one valve, as a result of the valve block moving away from the nozzle block, in which case the mass which enters the metering chamber passes directly to the nozzles of the nozzle block. On the other hand, this permits the volume of the metering chamber to be made smaller, and therefore mass to be expelled from the metering chamber via the nozzles, as a result of the valve block moving toward the nozzle block.

The metering unit can contain ducts which extend from the interior of the mass container to a respective nozzle of the metering unit. The metering unit preferably forms part of the spatial delimitation of the mass container volume, wherein the metering unit can be moved relative to the mass container. Therefore, for example in the case of a closed mass container, a pressure effect due to reduction of the mass container volume can also be achieved in addition to the suction effect when the metering chamber volume becomes larger, as a result of which the filling of the metering chamber during the intake stroke is accelerated.

The nozzle expediently has a nozzle opening whose flow cross section or opening cross section is flexible. The nozzle is preferably elastic. This firstly permits the geometric peripheral conditions of the nozzle to be adapted, and secondly allows the flow properties of the castable mass which are due to the material structure to be influenced selectively. By increasing the flow cross section and/or opening cross section of the nozzle at the start of the casting process, and preferably reducing the flow cross section and/or opening cross section of the nozzle during the casting process, it is therefore possible to homogenize the pressure profile during an entire casting cycle.

The flow and/or opening cross section of the nozzle can be controllable, in which case it is particularly expedient if the opening cross section of the nozzle opening can be controlled by pressure. The absolute pressure in the interior of the mass container can be used for this. Alternatively or additionally, the pressure which controls the nozzle opening can be imparted by means of the castable mass which is contained in the interior of the mass container and is in contact with the inner wall of the nozzle opening.

In addition to this active exertion of influence on the nozzle cross section, the nozzle can also have a purely passive behavior with respect to flows. The nozzle has a valve function for this. This embodiment permits the valve functions described at the beginning in addition to the pistons or in combination with the pistons (reciprocating rotary piston) to be dispensed with.

In one particularly advantageous embodiment, the nozzle has a flexible elastic material, in particular an elastomer material, at least in the region of the nozzle opening. This permits at least part of the nozzle to adapt itself automatically to the pressure conditions and flow conditions during a casting cycle (passive compensation). Since the elastomer material expands at the start of the casting cycle, the pressure peak at the start of the casting cycle can be markedly reduced, while, after the flow limit has been overcome, the elastomer material contracts and in this way the flow speed and therefore the shearing rate in the flow remain high, which leads to a low viscosity, for example in the case of a chocolate mass.

The nozzle advantageously has an elastic element which closes off the nozzle opening in the state of rest. This prevents any subsequent flowing at the end of the casting cycle. The elastic element may be a ring-like element which extends around the nozzle opening.

The opening cross section of the nozzle opening can preferably be controlled by pressure. For this purpose, the nozzle may have an elastic element with a cavity which has a fluidic connection to a fluid source with a variable fluid pressure. As a result, the elastic element can be filled with a fluid and inflated to a greater or lesser degree by means of the fluid pressure. During a casting cycle, selective active adaptation of the nozzle cross section and/or of the nozzle duct geometry can therefore take place (active compensation). As a result of the fluid pressure in the cavity of the elastic element, the elasticity and therefore the flexibility of said elastic element can be set selectively and adapted to the flow properties of the material to be cast.

In a further embodiment, vibro elements are arranged on or in the ducts. With these vibro elements it is possible to act on the mass to be cast in order to influence its rheological properties such as its flow limit or its viscosity. In the case of suspensions such as molten chocolate in which sugar particles and cocoa particles are suspended in the molten fat, the flow limit and viscosity of the suspension can be reduced by vibrating it. A mass which is to be cast and whose effective viscosity ("vibro-viscosity") which is caused by vibration is lower than the conventional viscosity ("viscosity at rest") requires less energy to feed it through a casting machine.

The nozzles of the nozzle block and the valves of the valve block are preferably formed by identical elements, i.e. they can be freely interchanged with one another. The features which such nozzle elements or valve elements essentially have in common in this case are the transmission behavior in one direction and the blocking behavior in the opposite direction as well as a necessary minimum difference in pressure between the upstream-feeding-side and the downstream-feeding-side pressure at the nozzle element or valve element in order to open the latter for material to pass through.

It is particularly advantageous if in each case a nozzle of the nozzle block and in each case a valve of the valve block are arranged along a respective virtual line which describes the relative movement between the nozzle block and the valve block. This leads to a situation in which, when the inventive relative movement of the valve block with respect to the nozzle block occurs, an identical relative movement takes place between each of the valves of the valve block and each of the assigned nozzles of the nozzle block. The mass which is to be cast is therefore subjected to identical conditions in the region between each valve/nozzle pair, which leads to an identical flow behavior of the cast mass at each nozzle.

An elongate element which is assigned to the respective valve and the respective nozzle can extend along the virtual line, said elongate element extending from the side of the mass container as far as the respective valve or through the valve, and extending with its first end into the metering chamber or even through the metering chamber and through the nozzle. In this case, the nozzles and the valves are composed of an elastic material and preferably extend around the line of the relative movement, with the nozzles and the valves being embodied, in particular, in the manner of a tab. The nozzles and the valves may be embodied in the manner of a torus. As a result, a function of the valves and nozzles is made possible despite the elongate elements which project to a lesser or greater extent into the metering unit according to the invention.

The elongate element can be a vibro element. As a result, the mass which is to be cast can be influenced by vibration up to just before its passage through the respective nozzle, with the result that the rheological properties of the mass can be satisfactorily controlled during the entire casting process.

The elongate element may be a small tube whose second end can open into a further container for holding a further edible product. This makes it possible to add a further edible material (for example marzipan filling, praline, nuts etc.) to the mass to be cast (for example chocolate), during the casting process.

A mold unit with cavities (alveoli) into which the castable material can be poured is expediently assigned to the casting device according to the invention or the metering unit according to the invention. A vibro element for vibrating the mold unit is preferably assigned to the mold unit. As a result, the cast mass can also be influenced by vibration after its emergence from the nozzle.

In the above-described arrangement of the valve and of the nozzle along the virtual line of the relative movement between the valve block and nozzle block, a respective metering chamber with a metering chamber volume, which can be changed by the relative movement between the nozzle and the valve, is preferably delimited between, in each case, a nozzle of the nozzle block and, in each case, a valve of the valve block. The respective metering chambers have a relatively small volume which is much smaller than the volume of the mass container in all cases, with the result that the mass volume which is drawn from the mass container for a casting cycle is distributed among a large number of individual metering chambers.

This not only permits the mass which is to be cast to be influenced mechanically in a selective manner in each metering chamber but also allows selective thermal influencing of said mass. For this purpose, a temperature conditioning element is preferably assigned to each metering chamber. The temperature conditioning element may be a heating element, a cooling element or a combined heating/cooling element. Preferred heating elements are heat exchangers with a hot heat carrier fluid, in particular water, or resistive heating elements. Preferred cooling elements are heat exchangers with a cold heat carrier fluid, in particular water or Peltier elements.

The nozzle block, the valve block and the duct walls may be composed of metal, in particular aluminum, or of polymer material. It is particularly advantageous if the valve block and the nozzle block are composed of polymer material or of ceramic material which is a good thermal insulator, and if only the internal walls of the valve block and of the nozzle block which delimit the metering chamber volume are coated with a metal which is a good thermal conductor such as, for example, aluminum, copper or silver. In particular, a multilayer internal lining with various metals, preferably aluminum, silver or aluminum, copper or aluminum, copper, silver in that order from the block to the surface, is provided on the inner walls which form the metering chamber. The inner surface facing the metering chamber volume can also have, in certain sections, copper and silver on an aluminum base layer or a copper/silver alloy on the aluminum base layer. These measures permit a largely uniform temperature to be obtained on the inner surfaces of the casting device which come into contact with the mass during the casting process, and allow local temperature differences in the mass to be rapidly equalized. Furthermore, in particular the metals copper and silver permit a microbicidal effect to be achieved, which contributes to the hygiene of the device according to the invention.

The object mentioned at the beginning is also achieved by means of a method for casting an edible product from a castable mass, in particular a fat mass such as chocolate, which contains, if appropriate, further portions of an edible product, in particular edible particles such as nuts or filled capsules, using the device described above, wherein the method has the following steps:
a) filling of the mass container with the castable mass;
b) sucking of mass into the metering chamber by enlarging the metering chamber volume through a first relative movement between the nozzle block and the valve block;
c) discharging mass from the metering chamber by making the metering chamber volume smaller through a second relative movement between the nozzle block and the valve block.

The use of the metering chamber which is delimited between the valve block and the nozzle block ensures a simple method of functioning of the device according to the invention. The method according to the invention uses only two simple movements, specifically a first relative movement of the valve block with respect to the nozzle block as a forward movement for the intake stroke, and a second relative movement of the valve block with respect to the nozzle block as a return movement for the expulsion stroke.

The valves of the valve block are installed in such a way that when the nozzle chamber volume becomes larger said valves are opened owing to the positive pressure difference between the mass container volume and the metering chamber volume (intake stroke, first relative movement), and when the metering chamber volume is made smaller said valves are closed owing to the negative pressure difference between the mass container volume and the metering chamber volume (expulsion stroke, second relative movement).

The nozzles of the nozzle block are installed in such a way that when the metering chamber volume becomes larger said nozzles are closed owing to the negative pressure difference between the metering chamber volume and the ambient pressure/atmospheric pressure (intake stroke, first relative movement), and when the metering chamber volume is made smaller said nozzles are opened owing to the positive pressure difference between the metering chamber volume and the ambient pressure/atmospheric pressure (expulsion stroke, second relative movement).

In order to influence the rheological properties of the cast mass, it is possible to make it vibrate before, between or after steps a) to c).

The mass is preferably made to vibrate at least between the steps b) and c) or during the steps b) and c).

The casting method according to the invention, after step c), expediently has a further step d) for casting the mass which has been expelled from the metering chamber into the cavities (alveoli) of the mold unit. The mass can be made to vibrate during the step d), the mass preferably being vibrated by vibrating the mold unit. It is particularly advantageous if the mold unit is vibrated in the horizontal direction.

The castable mass (for example chocolate) is typically pseudoplastic. The cycle time which is determined by the steps b) and c) is shorter than the structure recovery time of the castable mass, i.e. shorter than the time for restoring the structure of the mass after the deformation of the mass has ended.

During or after step b) and before step c), a further step e) for metering a portion or at least a particle of a further edible product into the metering chamber can take place. As a result, a further edible material (for example a portion of marzipan filling, praline, nuts, a filled capsule etc.) can be added to the mass (for example chocolate) during the casting. The further edible material originates from an edible material container which is separated from the mass container. The clocking of the mixing process is coordinated here with the clocking of the casting, with the result that a corresponding edible material portion (marzipan filling, praline, nuts, filled capsule or capsules etc.) is added to each portion of mass (for example chocolate).

Further advantages, features and application possibilities of the invention emerge from the description of various embodiments which will now be given with reference to the drawing, in which:

FIGS. 1A, 1B, 1C and 1D show a first, second, third and fourth embodiment of the metering unit according to the invention in a first operating phase;

FIGS. 2A, 2B, 2C and 2D show the first, second, third and fourth embodiments of the metering unit according to the invention in a second operating phase;

FIGS. 3A, 3B, 3C and 3D show the first, second, third and fourth embodiments of the metering unit according to the invention in a third operating phase;

FIGS. 4A, 4B, 4C and 4D show the first, second, third and fourth embodiments of the metering unit according to the invention in a fourth operating phase;

FIGS. 5A, 5B, 5C and 5D show the first, second, third and fourth embodiments of the metering unit according to the invention in a fifth operating phase;

FIGS. 6A, 6B, 6C and 6D show the first, second, third and fourth embodiments of the metering unit according to the invention in a sixth operating phase;

FIGS. 7A, 7B, 7C and 7D show, on the basis of the first embodiment, the pressure conditions during the operation of the first, second, fourth and fifth operating phase of the metering unit according to the invention;

FIGS. 8A and 8B show metering units of the first embodiment (cf. FIG. 1A in a possible arrangement, FIGS. 8C and 8D show an arrangement of a fifth embodiment of the metering unit according to the invention;

Figure 10B:
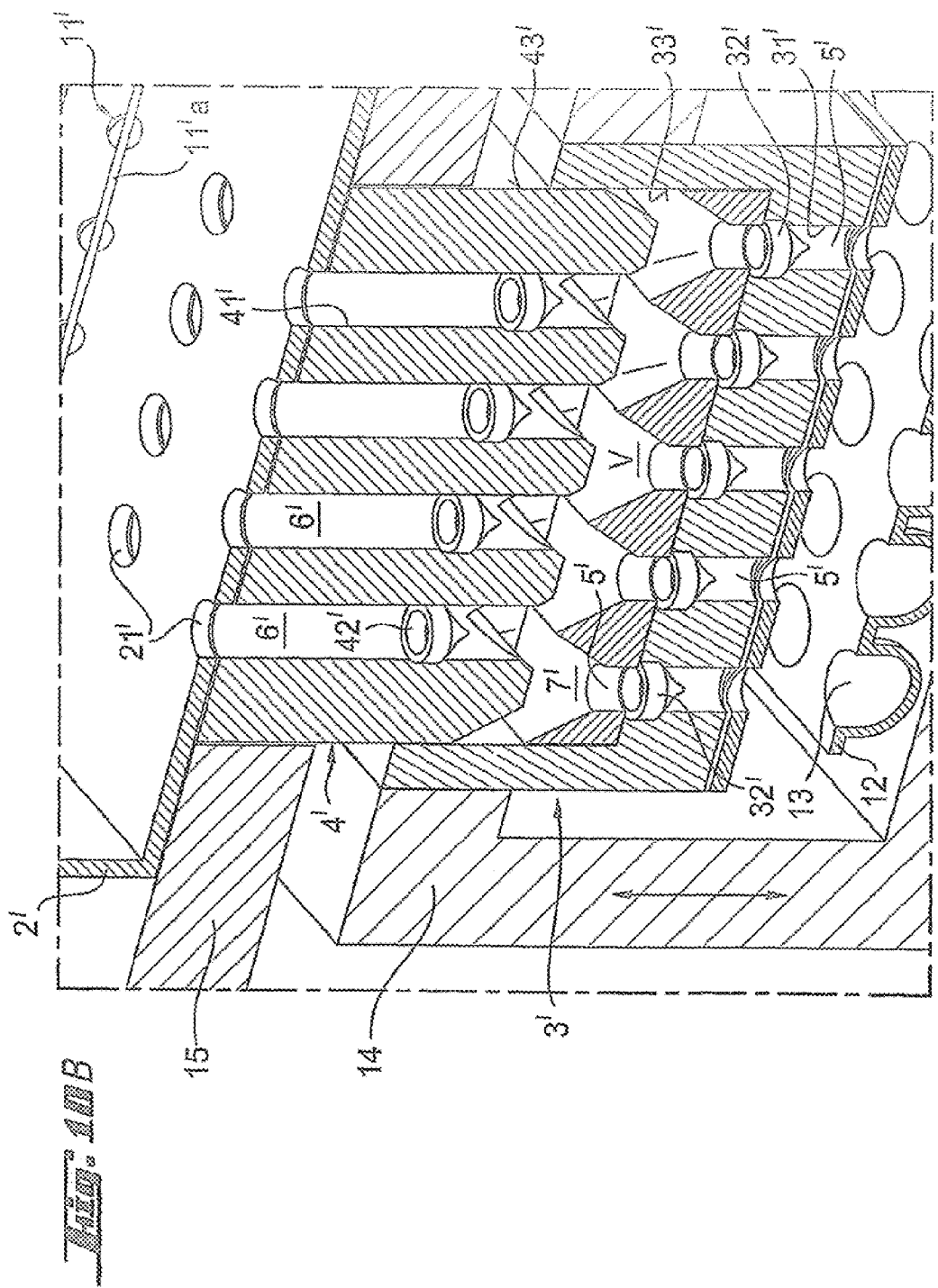

FIG. 9 shows a perspective view of a first variant, in section along a vertical plane, of the casting device according to the invention, wherein the first embodiment of the metering unit according to the invention forms part of the casting device, and FIG. 10A shows a perspective view of a second variant, in section along a vertical plane, of the casting device according to the invention, wherein a fifth embodiment of the metering unit according to the invention forms part of the casting device, and FIG. 10B shows an enlarged detail from FIG. 10A (XB).

The design of the first embodiment of the metering unit 3, 4 according to the invention will now be described with reference to FIG. 1A, said metering unit 3, 4 having a nozzle block 3 and a valve block 4.

The nozzle block 3 contains a number of nozzle ducts 5 which are arranged one next to the other and parallel to one another, just one of which is illustrated in the figure, and the cross section of which is preferably circular. Each of the nozzle ducts is delimited by a duct wall 31 which is preferably cylindrical. At the lower end of a nozzle duct 5 there is a nozzle 32, and at the upper end of a nozzle duct 5 there is a valve 42. A metering chamber 7 is defined by the duct wall 31, the nozzle 32 and the valve 42, the volume V of which metering chamber 7 is variable and formed by a variable section of the nozzle duct 5.

The valve block 4 also contains a plurality of valve ducts 6 which are arranged one next to the other and parallel to one another, just one of which is likewise illustrated in the figure, and the cross section of which corresponds to the cross section of the nozzle ducts 5, and is preferably therefore also circular. Each of the valve ducts 6 is delimited by a duct wall 41 which is preferably cylindrical. A valve 42 is located at the lower end of a valve duct 6, and each valve duct 6 is connected at the upper end to a mass container 2 (see FIG. 9).

The duct wall 31, the nozzle 32 and the valve 42 determine the metering chamber 7 with its volume V. The internal cross section of a nozzle duct 5 corresponds to the external cross section of a valve duct 6. Each valve duct 6 can be displaced in the interior of a nozzle duct 5 along the common axis X of the ducts 5 and 6. This relative movement of the duct wall 41 with respect to the duct wall 31 allows the volume V of the metering chamber 7, which is essentially determined by the duct wall 31, the nozzle 32 and the valve 42, to be changed. An annular seal 43, which is mounted as a sealing ring 43 in an annular groove in the outer surface of the channel wall 41, ensures that the metering chamber 7 is sealed and prevents castable mass from being able to spread out between the duct wall 31 and the duct wall 41 and to emerge from the metering chamber 7 in an uncontrolled way. The annular seal can also be embodied as an annular bead (not illustrated) which is integral with the duct wall. A plurality of axially spaced-apart sealing rings 43 or annular beads (not illustrated) can optionally also be provided on the duct wall 41.

The nozzle 32 is formed from an elastic material. If a sufficiently small difference in pressure is present between the metering chamber 7 and the surroundings (atmosphere) at the nozzle 32, i.e. if a minimum nozzle pressure difference is not exceeded, the elastic material of the nozzle remains essentially undeformed and the nozzle 32 remains closed. The nozzle does not open until the minimum nozzle pressure difference is exceeded.

The same applies to the valve 42. The valve 42 is likewise formed from an elastic material. If a sufficiently small pressure difference between the valve duct 6 and the metering chamber 5 is present at the valve 42, i.e. if a minimum valve pressure difference is not exceeded, the elastic material of the valve remains essentially undeformed and the valve 42 remains closed. The valve 42 does not open until the minimum valve pressure difference is exceeded.

The method of functioning of the first embodiment of the metering unit 3, 4 according to the invention will now be described with reference to FIGS. 1A, 2A, 3A, 4A, 5A and 6A.

FIG. 1A shows the first phase of a casting cycle of the first embodiment of the metering unit 3, 4 according to the invention. The valve block 4, or each of the valve ducts 6, is pulled out of the nozzle block 3 or out of the respective nozzle duct 5 along the axis X to an extent which corresponds to the required metering volume. The valve block 4 is located at the end of the intake stroke and is at rest with respect to the nozzle block 3. The volume V of the metering chamber 7 assumes its maximum value. Each valve duct 6 and each nozzle duct 5 is filled with a castable mass M which is sufficiently viscous that it comes to rest virtually immediately after being taken in. This is simultaneously the start of the expulsion stroke. The nozzle 32 and the valve 42 are closed. The mass M is at rest.

FIG. 2A shows the second phase of the casting cycle. The valve block 4, or each of the valve ducts 6, is pushed into the nozzle block 3 or into the respective nozzle duct 5 along the axis X. The valve 42 is closed and the nozzle 32 is open. The mass M in the metering chamber 7 is expelled through the nozzle 32 from the volume V of the metering chamber which is becoming smaller. The valve block 4 is located at a point within the expulsion stroke and moves with respect to the nozzle block 3. Each valve duct 6 and each nozzle duct 5 are filled with mass M which moves during the expulsion stroke.

FIG. 3A shows the third phase of the casting cycle. The valve block 4, or each of the valve ducts 6, is pushed into the nozzle block 3 or into the respective nozzle duct 5 along the axis X almost to an extent which corresponds to the required metering volume.

The valve 42 is closed and the nozzle 32 is still open. The mass M in the metering chamber 5 continues to be expelled through the nozzle 32.

The valve block 4 is located just before the end of the expulsion stroke and is still moving with respect to the nozzle block 3. The volume V of the metering chamber 7 has almost reached its minimum value. Each valve duct 6 and each nozzle duct 5 are filled with mass M.

FIG. 4A shows the fourth phase of the casting cycle. The valve block 4, or each of the valve ducts 6, is pulled out of the nozzle block 3 or out of the respective nozzle duct 5 along the axis X. The valve 42 is open and the nozzle 32 is closed. The mass M is sucked through the valve 42 into the volume V of the metering chamber 7 which is becoming larger. The valve block 4 is located at a point within the intake stroke and is moving with respect to the nozzle block 3. The volume V of the metering chamber 7 is becoming larger. Each valve duct 6 and each nozzle duct 5 is filled with mass M which moves during the intake stroke.

FIG. 5A shows the fifth phase of the casting cycle. The valve block 4, or each of the valve ducts 6, is pulled out of the nozzle block 3 or out of the respective nozzle duct 5 along the axis X almost to an extent which corresponds to the required metering volume. The valve 42 is still open, and the nozzle 32 is still closed. The mass M continues to be sucked through the valve 42 into the volume V of the metering chamber 7 which is becoming larger. The valve block 4 is located just before the end of the intake stroke and is still moving with respect to the nozzle block 3. The volume V of the metering chamber 5 has almost reached its maximum value. Each valve duct 6 and each nozzle duct 5 is filled with mass M.

FIG. 6A shows the sixth phase of a casting cycle of the first embodiment of the metering unit 3, 4 according to the invention. The valve block 4, or each of the valve ducts 6, is pulled out of the nozzle block 3 or out of the respective nozzle duct 5 along the axis X to an extent which corresponds to the required metering volume. The valve block 4 is located at the end of the intake stroke and is at rest with respect to the nozzle block 3. The volume M of the metering chamber 7 assumes its maximum value again. Each valve duct 6 and each nozzle duct 5 is filled with mass M. This is at the same time the start of the expulsion stroke (see FIG. 1A). The nozzle 32 and the valve 42 are closed. The mass M is at rest.

The design of the second embodiment of the metering unit 3, 4 according to the invention having a nozzle block 3 and a valve block 4 will now be described with reference to FIG. 1B. Elements which are identical with those of the first embodiment have the same reference symbols. Elements whose function is the same as in the first embodiment are described only briefly or not described any more.

The second embodiment differs from the first embodiment in that the valve 42 in the valve duct 6 is arranged much higher, i.e. nearer to the mass container (see FIG. 9). The volume V of the metering chamber 7 is therefore approximately twice as large here as in the first embodiment.

The method of functioning of the second embodiment of the metering unit 3, 4 according to the invention will now be described with reference to FIGS. 1B, 2B, 3B, 4B, 5B and 6B.

FIG. 1B shows the first phase of a casting cycle of the second embodiment of the metering unit 3, 4 according to the invention. The valve block 4 is located at the end of the intake stroke and is at rest with respect to the nozzle block 3. The volume V of the metering chamber 7 assumes its maximum value. Each valve duct 6 and each nozzle duct 5 is filled with a castable mass M. This is at the same time the start of the expulsion stroke. The nozzle 32 and the valve 42 are closed. The mass M is at rest.

FIG. 2B shows the second phase of the casting cycle. The valve block 4, or each of the valve ducts 6, is pushed into the nozzle block 3 or into the respective nozzle duct 5 along the axis X. The valve 42 is closed, and the nozzle 32 is open. The mass M in the metering chamber 7 is expelled through the nozzle 32 from the volume V of the metering chamber which is becoming smaller.

FIG. 3B shows the third phase of the casting cycle. The valve block 4, or each of the valve ducts 6, is pushed into the nozzle block 3 or into the respective nozzle duct 5 along the axis X almost to an extent which corresponds to the required metering volume. The valve 42 is closed and the nozzle 32 is still open. The mass M in the metering chamber 5 continues to be expelled through the nozzle 32. However, a residual volume of mass M which corresponds approximately to the volume of the valve duct 6 underneath the valve 42 is not expelled during this expulsion stroke.

FIG. 4B shows the fourth phase of the casting cycle. The valve block 4, or each of the valve ducts 6, is pulled out of the nozzle block 3 or out of the respective nozzle duct 5 along the axis X. The valve 42 is open, and the nozzle 32 is closed. Further mass M is sucked through the valve 42 into the volume V of the metering chamber 7 which becomes larger, and is mixed here with the mass residual volume in the valve duct 6.

FIG. 5B shows the fifth phase of the casting cycle. The valve block 4, or each of the valve ducts 6, is pulled out of the nozzle block 3 or out of the respective nozzle duct 5 along the axis X almost to an extent which corresponds to the required metering volume. The valve 42 is still open and the nozzle 32 is still closed. The mass M continues to be sucked through the valve 42 into the volume V of the metering chamber 7 which becomes larger, and in the process it continues to mix with the mass residual volume in the valve duct 6.

FIG. 6B shows the sixth phase of a casting cycle of the second embodiment of the metering unit 3, 4 according to the invention. The valve block 4, or each of the valve ducts 6, is pulled out of the nozzle block 3 or out of the respective nozzle duct 5 along the axis X to an extent which corresponds to the required metering volume. The valve block 4 is located at the end of the intake stroke and is at rest with respect to the nozzle block 3. The volume V of the metering chamber 7 assumes its maximum value again. Each valve duct 6 and each nozzle duct 5 is filled with mass M which has been formed by the mass residual volume of the previous expulsion stroke, on the one hand, and by the mass which has been sucked in the intake stroke which has just ended, on the other. This is at the same time the start of the next expulsion stroke (see FIG. 1B). The nozzle 32 and the valve 42 are closed. The mass M is at rest.

The design of the third embodiment of the metering unit 3, 4 according to the invention will now be described with reference to FIG. 1C, said metering unit 3, 4 having a nozzle block 3 and a valve block 4. Elements which are identical to those of the first embodiment have the same reference symbols. Elements whose function is the same as in the first embodiment are only briefly described or not described any more.

The third embodiment differs from the first embodiment in that a concentrically arranged small tube 61, which is filled with a further edible material in the form of pieces 62 of edible material, projects into the valve duct 6. Said pieces 62 can be nuts, dried fruits, praline, sugar capsules or the like, and in this context the sugar capsules contain, in particular, a pasty or fluid foodstuff filling. The small tube 61 is rigidly connected via a connection (not illustrated) to the valve block 4, with the result that the distance A between the lower end 61a of the small tube 61 and the valve 42 is constant. This distance A is set in such a way that it corresponds approximately to the diameter of a piece 62 of edible material, or is even larger than it.

The method of functioning of the third embodiment of the metering unit 3, 4 according to the invention will now be described with reference to FIGS. 1C, 2C, 3C, 4C, 5C and 6C.

FIG. 1C shows the first phase of a casting cycle of the third embodiment of the metering unit 3, 4 according to the invention. The valve block 4, or each of the valve ducts 6, is pulled out of the nozzle block 3 or out of the respective nozzle duct 5 along the axis X to an extent which corresponds to the required metering volume. The valve block 4 is located at the end of the intake stroke and is at rest with respect to the nozzle block 3. The volume V of the metering chamber 7 assumes its maximum value. Each valve duct 6 and each nozzle duct 3 is filled with a castable mass M. This is at the same time the start of the expulsion stroke. The nozzle 32 and the valve 42 are closed. The mass M is at rest.

FIG. 2C shows the second phase of the casting cycle. The valve block 4, or each of the valve ducts 6, is now pushed into the nozzle block 3 or into the respective nozzle duct 5 along the axis X. The valve 42 is closed, and the nozzle 32 is open. The mass M in the metering chamber 7 is expelled through the nozzle 32 from the volume V of the metering chamber 7 which becomes smaller. Each valve duct 6 and each nozzle duct 5 is filled with the mass M. At the same time, a piece 62 of edible material is forced downward out of the small tube 61 by the force of gravity and/or an additional downward-directed force applied by a means (not illustrated), and said piece 62 of edible material is positioned between the lower end 62a of the small tube and the valve 42, that is to say it is located along the distance A.

FIG. 3C shows the third phase of the casting cycle. The valve block 4, or each of the valve ducts 6, is pushed into the nozzle block 3 or into the respective nozzle duct 5 along the axis X to an extent which corresponds to the required metering volume. The valve 42 is closed and the nozzle 32 is still open. The mass M in the metering chamber 5 continues to be expelled through the nozzle 32.

The valve block 4 is located just before the end of the expulsion stroke and is still moving with respect to the nozzle block 3. The volume V of the metering chamber 7 has almost reached its minimum value. Each valve duct 6 and each metering duct 5 is filled with mass M.

FIG. 4C shows the fourth phase of the casting cycle. The valve block 4, or each of the valve ducts 6, is pulled out of the nozzle block 3 or out of the respective nozzle duct 5 along the axis X. The valve 42 is open, and the nozzle 32 is closed. A portion of the mass M, and with it the piece 62 of edible material underneath the small tube 61, is sucked through the valve 42 into the volume V of the metering chamber 7 which is becoming larger. The valve block 4 is located at a point within the intake stroke and moves with respect to the nozzle block 3. The volume V of the metering chamber 7 becomes larger. Each valve duct 6 and each nozzle duct 5 is filled with mass M which moves during the intake stroke.

FIG. 5C shows the fifth phase of the casting cycle. The valve block 4, or each of the valve ducts 6, is pulled out of the nozzle block 3 or out of the respective nozzle duct 5 along the axis X almost to an extent which corresponds to the required metering volume. The valve 42 is still open, and the nozzle 32 is still closed. Further mass M is sucked through the valve 42 into the volume V of the metering chamber 7 which becomes larger. The piece 62 of edible material remains essentially at the same point in the lower region of the metering chamber 7. The valve block 4 is located just before the end of the intake stroke and is still moving with respect to the nozzle block 3. The volume V of the metering chamber 5 has almost reached its maximum value. Each valve duct 6 and each nozzle duct 5 is filled with mass M.

FIG. 6C shows the sixth phase of a casting cycle of the first embodiment of the metering unit 3, 4 according to the invention. The valve block 4, or each of the valve ducts 6, is pulled out of the nozzle block 3 or out of the respective nozzle duct 5 along the axis X to an extent which corresponds to the required metering volume. The valve block 4 is located at the end of the intake stroke and is at rest with respect to the nozzle block 3. The volume V of the metering chamber 7 again assumes its maximum value. Each valve duct 6 and each nozzle duct 5 is filled with mass M. In the metering chamber 7 which is formed by the nozzle duct 5 there is, in addition to the mass M, also the piece 62 of edible material. This is at the same time the start of the expulsion stroke (see FIG. 1C). The nozzle 32 and the valve 42 are closed. The mass M is at rest.

The design of the fourth embodiment of the metering unit 3, 4 according to the invention, which has a nozzle block 3 and a valve block 4, will now be described with respect to FIG. 1D.

The fourth embodiment differs from the first embodiment in that a concentrically arranged small tube 63, which is filled with a further edible material in the form of an edible material paste 64, projects into the valve duct 6. Said edible material can be a nut-based material (nougat), an almond-based material (marzipan), a fine praline, a fine sugar, a fruit paste or the like. The small tube 63 is rigidly connected to the valve block 4 via a connection (not illustrated), and its lower end 63a projects as far as the valve 42.

The method of functioning of the fourth embodiment of the metering unit 3, 4 according to the invention will now be described with reference to FIGS. 1D, 2D, 3D, 4D, 5D and 6D.

FIG. 1D shows the first phase of a casting cycle of the fourth embodiment of the metering unit 3, 4 according to the invention. The valve block 4 or each of the valve ducts 6, is pulled out of the nozzle block 3 or out of the respective nozzle duct 5 along the axis X to an extent which corresponds to the required metering volume. The valve block 4 is located at the end of the intake stroke and is at rest with respect to the nozzle block 3. The volume V of the metering chamber 7 assumes its maximum value. Each valve duct 6 and each nozzle duct 5 is filled with a castable mass M. The small tube 63 is filled with an edible material paste 64. This is at the same time the start of the expulsion stroke. The nozzle 32 and the valve 42 are closed. The mass M and the edible material paste 64 are at rest.

FIG. 2D shows the second phase of the casting cycle. The valve block 4, or each of the valve ducts 6, will now be inserted into the nozzle block 3 or into the respective nozzle duct 5 along the axis X. The valve 42 is closed and the nozzle 32 is open. The mass M in the metering chamber 7 is expelled through the nozzle 32 from the volume V of the metering chamber 7 which becomes smaller. Each valve duct 6 and each nozzle duct 5 is filled with mass M. The small tube 63 is filled with edible material paste 64. FIG. 3D shows the third phase of the casting cycle. The valve block 4, or each of the valve ducts 6, is pushed into the nozzle block 3 or into the respective nozzle duct 5 along the axis X almost to an extent which corresponds to the required metering volume. The valve 42 is closed, and the nozzle 32 is still open. The mass M in the metering chamber 5 continues to be expelled through the nozzle 32. The valve block 4 is located just before the end of the expulsion stroke and is still moving with respect to the nozzle block 3. The volume V of the metering chamber 7 has almost reached its minimum value. Each valve duct 6 and each nozzle duct 5 is filled with mass M. The small tube 63 is filled with edible material paste 64.

FIG. 4D shows the fourth phase of the casting cycle. The valve block 4, or each of the valve ducts 6, is pulled out of the nozzle block 3 or out of the respective nozzle duct 5 along the axis X. The valve 42 is open, and the nozzle 32 is closed. A portion of the mass M is sucked through the valve 42 into the volume V of the metering chamber 7 which becomes larger. At the same time, a strand of edible material paste 64 is forced downward out of the small tube 63 through the open valve 42 into the metering chamber 7 (by means which are not illustrated). The valve block 4 is located at a point within the intake stroke and moves with respect to the nozzle block 3. The volume V of the metering chamber 7 becomes larger. Each valve duct 6 and each nozzle duct 5 is filled with mass M which moves during the intake stroke. While the volume V of the metering chamber 7 becomes larger, edible material paste 64 continues to be pressed out of the small tube 63, with the result that the strand of edible material paste 64 continues to become longer.

FIG. 5D shows the fifth phase of the casting cycle. The valve block 4, or each of the valve ducts 6, is pulled out of the nozzle block 3 or out of the respective nozzle duct 5 along the axis X almost to an extent which corresponds to the required metering volume. The valve 42 is still open, and the nozzle 32 is still closed. Further mass M is sucked through the valve 42 into the volume V of the metering chamber 7 which becomes larger, and further edible material paste is pressed into the metering chamber 7. The valve block 4 is located just before the end of the intake stroke and is still moving with respect to the nozzle block 3. The volume V of the metering chamber 5 has almost reached its maximum value. Each valve duct 6 and each nozzle duct 5 is filled with mass M. The strand of edible material paste 64 extends out of the small tube through the valve 42 virtually over the entire height of the metering chamber 7.

FIG. 6D shows the sixth phase of a casting cycle of the first embodiment of the metering unit 3, 4 according to the invention. The valve block 4, or each of the valve ducts 6, is pulled out of the nozzle block 3, or out of the respective nozzle duct 5, along the axis X to an extent which corresponds to the required metering volume. The valve block 4 is located at the end of the intake stroke and is at rest with respect to the nozzle block 3. The volume V of the metering chamber 7 assumes its maximum value again. Each valve duct 6 and each nozzle duct 5 is filled with mass M. In the metering chamber 7 formed by the nozzle duct 5 there is, in addition to the mass M, also a section 65 of the strand of edible material paste 64. This section 65 was pinched off from the strand 64 projecting out of the small tube 63 by the closing valve 42 at the transition from the fifth phase (FIG. 5D) to the sixth phase (FIG. 6D). This is at the same time the start of the expulsion stroke (see FIG. 1D). The nozzle 32 and the valve 42 are closed. The mass M is at rest. The section 65 of the strand of edible material paste 64 is located in the metering chamber 7.

The pressure conditions during operation of the first, second, third and fourth embodiments of the metering unit 3, 4 according to the invention will now be described with reference to FIGS. 7A, 7B, 7C and 7D.

FIG. 7A shows the pressure conditions at the end of the intake stroke and at the start of the expulsion stroke. The valve block 4 is at rest with respect to the nozzle block 3. This mass M is also at rest. The pressure P1 in the metering chamber 7 which is formed by the nozzle duct 5 is the same size as the pressure P2 in the valve duct 6 (P1=P2). Owing to the hydrostatic pressure, the absolute values of the pressures P1 and P2 may be somewhat higher than the atmospheric pressure P0. This pressure difference P1−P0=P2−P0 is, however, smaller than the minimum nozzle pressure difference (opening pressure).

FIG. 7B shows the pressure conditions during the expulsion stroke. The valve block 4 moves downward with respect to the nozzle block 3. The pressure P1 in the metering chamber 7 which is formed by the nozzle duct 5 is higher than the pressure P2 in the valve duct (P1>P2). The valve 42 is closed. Furthermore, the pressure P1 in the metering chamber 7 is higher than the atmospheric pressure P0. The nozzle 32 is opened.

FIG. 7C shows the pressure conditions during the intake stroke. The valve block 4 is moving upward with respect to the nozzle block 3. The pressure P1 in the metering chamber 7 which is formed by the nozzle duct 5 is lower than the pressure P2 in the valve duct (P1<P2). The valve 42 is opened. Furthermore, the pressure P1 in the metering chamber 7 is lower than the atmospheric pressure P0. The nozzle 32 is closed.

FIG. 7D shows the pressure conditions toward the end of the intake stroke. The valve block 4 is still moving with respect to the nozzle block 3. The pressure P1 in the metering chamber 7 which is formed by the nozzle duct 5 is still lower than the pressure P2 in the valve duct 6 (P1<P2). The valve 42 is still opened. Furthermore, the pressure P1 in the metering chamber 7 is lower than the atmospheric pressure P0. The nozzle 32 is still closed.

FIG. 8A shows an arrangement of metering units of the first embodiment of the metering unit according to the invention in a vertical sectional view (cf. FIG. 1A), wherein only two nozzle duct/valve duct units 5, 6 are illustrated in the nozzle block 3 and the valve block 4 in this view (see FIG. 9).

FIG. 8B shows the first embodiment of the metering unit according to the invention in a view from below, three nozzle duct/valve duct units 5, 6 arranged one next to the other being illustrated in this view.

FIG. 8C shows a fifth embodiment of the metering unit according to the invention in a vertical sectional view, wherein only two nozzle duct/valve duct units 5, 6 are illustrated in the nozzle block 3 and the valve block 4 in this view (see FIG. 9). The fifth embodiment differs from the first in that a distributor fitting 9 is fitted onto the lower end of the nozzle duct 5 over the nozzle 32, and it corresponds at its upper end to the cross section of the nozzle duct 5 and at its lower end contains a total of four nozzles 34, 35, 36, 37. The fitting wall 33 of the distributor fitting 9 has a similar shape to the duct wall 31 of the nozzle duct 5. Both taper in a cone-like manner in the direction of flow at their lower end. A distributor chamber 8 is delimited between the fitting wall 33, the nozzle 32 and the nozzles 34, 35, 36, 37. A distributor body 38 which tapers in the direction opposite to the direction of flow projects into the distributor chamber 8 starting from an internal region between the four nozzles 34, 35, 36, 37, in the opposite direction to the direction of flow, i.e. from bottom to top in FIG. 8C. The distributor body 38 is in the shape of a pyramid or cone.

FIG. 8D shows the fifth embodiment of the metering unit according to the invention in a view from below, with three nozzle duct/valve duct units 5, 6 which are arranged one next to the other being illustrated in this view. It is apparent that the distributor fitting 9 with its nozzles 34, 35, 36, 37 multiplies the arrangement density or "packing density" of the nozzles compared to the first embodiment (FIG. 8A), which is achieved by reducing the cross section of each of the nozzles 34, 35, 36, 37 compared to the cross section of the nozzle 32.

FIG. 9 is a perspective view of a first variant of the casting device 1 according to the invention which is sectioned along a vertical plane, wherein the first embodiment (see FIGS. 1A, 8A) of the metering unit 3, 4 according to the invention forms part of the casting device 1. The metering device 1 contains, arranged from top to bottom, essentially three elements, specifically a mass container 2, a valve block 4 and a nozzle block 3.

The valve block 4 is embodied in the form of a plate and is connected at its upper side to the mass container 2 and at its underside to a plurality of cylindrical valve ducts 6 which each extend perpendicularly with respect to the planar underside of the valve block 4 and are each formed by a cylindrical duct wall 41. At their lower end, they each have a valve 42. The base of the mass container 2 contains a plurality of holes 21, each of which opens into one of the valve ducts 6.

The nozzle block 3 is formed here by a lower plate 3a and an upper plate 3b which are oriented parallel to the valve block 4 and to the base of the mass container 2. The two plates 3a and 3b have a plurality of holes at which they are connected via a plurality of cylindrical nozzle ducts 5 which extend from the location of one of the holes in the plates 3a and 3b in a web-like manner between the lower plate 3a and the upper plate 3b and which are each formed by a cylindrical duct wall 31. The nozzle block 3 is therefore composed of a rigid unit which is formed by the lower plate 3a, the upper plate 3b and the plurality of web-like nozzle ducts 5. Each nozzle duct 5 has a nozzle 32 at its lower end.

The nozzle block 3 and the valve block 4 are mounted such that they slide one against the other. The sliding bearing is formed here by the plurality of cylindrical duct walls 41 of the valve ducts 6 and the plurality of cylindrical duct walls 31 of the nozzle ducts 5, with the outer wall of a respective valve duct wall 41 bearing against the inner wall of a respective nozzle duct wall 31 and said inner wall and outer wall can slide relative to one another along the respective cylinder axis X of the concentric cylinder duct walls 31, 41. This linear relative movement between the nozzle block 3 and the valve block 4 changes the volume V of the metering chambers 7 which are determined essentially by the nozzle duct wall 31 and by the nozzle 32 and the valve 42, as can be seen also from the cycle in FIGS. 1A, 2A, 3A, 4A, 5A and 6A. What has been stated with respect to FIGS. 7A, 7B, 7C and 7D applies to the pressure conditions in the nozzle duct 5 and in the inside of a metering chamber 7 determined by the latter and in the valve duct 6.

For the essential functioning of the casting machine 1 it is irrelevant whether the nozzle block 3 moves during a casting cycle and the valve block 4 is at rest, or vice versa, or whether both are moved simultaneously or successively.

In each of the metering chambers 7 there is a vibro element 11 by means of which vibrations can be input into the mass to be cast. The vibro elements 11 are in the form of small rods which extend transversely through each metering chamber 7 or each nozzle duct 5 and are mounted in the nozzle duct wall 31.

FIGS. 10A and 10B are each a perspective view of a second variant, which is sectioned along a vertical plane, of the casting device 1' according to the invention, in which a fifth embodiment of the metering unit according to the invention forms part of the casting device 1'. All the elements in FIGS. 10A and 10B which correspond to those in FIG. 9 are characterized by a prime sign ( . . . ').

In contrast to the first variant, a plurality of valve blocks 4' are provided here, and they are each connected at their upper side to the mass container 2', and they each have a plurality of valve ducts 6' which each extend perpendicularly with respect to the planar underside of the mass container 2' and are each formed by a cylindrical valve bore 41'. At its lower end, each valve duct 6' has, in each case, a valve 42'. The base of the mass container 2' contains a plurality of holes 21', each of which opens into one of the valve ducts 6'.

A plurality of nozzle blocks 3' are also provided, each of which nozzle blocks 3' is assigned to one of the valve blocks 4'. Each of the nozzle blocks 3' has a plurality of nozzle ducts 5', which each extend perpendicularly with respect to the planar underside of the mass container 2' and are each formed by a cylindrical nozzle bore 31'. In its lower region, each nozzle duct 5' has a valve 32' in each case.

The nozzle blocks 3' and the valve blocks 4' are mounted such that they slide one against the other. The sliding bearing is made possible here by planar sliding surfaces 33' on the respective nozzle blocks 3' and by planar sliding surfaces 43' on the respective valve blocks 4' (only two sliding surface pairs 33', 43' are shown per nozzle block/valve block unit), and in each case a nozzle block sliding surface 33' bears against a valve block sliding surface 43', which sliding surfaces 33' and 43' can slide relative to one another along the respective axis X' parallel to the bores 31', 41' of the nozzle blocks 3' and the valve blocks 4'. As a result of this linear relative movement between the nozzle block 3' and the valve block 4', the volume V of the metering chamber 7' of each nozzle block/valve block unit 3', 4' is changed.

In contrast to the first variant, in which the nozzle block/valve block unit 3, 4 (see FIG. 9) has a plurality of metering chambers 7 which are separated from one another, each nozzle block/valve block unit 3', 4' of the second variant has a single metering chamber 7', which extends to all the valves 42' and nozzles 32' and comprises all the valve bores 41' and nozzle bores 31' which communicate with one another via a region of the metering chamber 7' which extends over the entire basic outline of the valve block 4'. In other words, the metering chamber 7' is delimited by the sides of a nozzle block 3' and of the valve block 4' which face one another and by the internal sliding surfaces 33' of a nozzle block 3'.

Vibro elements 11', via which vibrations can be input into the mass to be cast, are arranged in the mass container 2'. The vibro elements 11', which are denoted in their entirety by 11', are in the form of small rods or cables 11'a which extend transversely through the mass container 2' and are all connected via a common frame 11'b which is connected to a vibro drive 11'c.

A mold unit 12, which contains in each case a plurality of cavities (alveoli) 13 which are each located underneath a nozzle 32' or underneath a nozzle duct 5', is arranged underneath each nozzle block 3'.

The mass container 2' and the valve blocks 4' are rigidly connected to a machine frame 15, while the nozzle blocks 3' and the mold units 12 are rigidly connected to a lifting frame 14 which is mounted in a sliding manner on the machine frame 15. Lifting drives 16, which can move the lifting frame 14 together with the mold units 12 and nozzle blocks 3' relative to the machine frame 15 and therefore relative to the valve blocks 4', are arranged between these two frames 14 and 15.

While the lifting frame 14 is lowered relative to the machine frame 15, the volume of the respective metering chamber 7' between the valve block 4' and the nozzle block 3' becomes larger, with the result that a partial vacuum is produced in the metering chambers 7', the valves 42' open and mass is sucked into the metering chambers 7' from the mass container 2'. The nozzles 32' are closed during this intake stroke.

While the lifting frame 14 is lifted relative to the machine frame 15, the volume of the respective metering chamber 7' between the valve block 4' and the nozzle block 3' becomes smaller, with the result that an overpressure is produced in the metering chambers 7', the valves 42' close and mass is metered out of the metering chamber 7' into the alveoli 13 via the nozzles 32' which are now open.

Reference Symbols

| | |
|---|---|
| 1 | Casting device |
| 1' | Casting device |
| 2 | Mass container |
| 2' | Mass container |

-continued

| | |
|---|---|
| 3 | Nozzle block |
| 3a | Lower plate |
| 3b | Upper plate |
| 3' | Nozzle block |
| 4 | Valve block |
| 4' | Valve block |
| 5 | Nozzle duct |
| 5' | Nozzle duct |
| 6 | Valve duct |
| 6' | Valve duct |
| 7 | Metering chamber |
| 7' | Metering chamber |
| 8 | Distributor chamber |
| 9 | Distributor fitting |
| 11 | Vibro element |
| 11' | Vibro element |
| 11'a | Rod |
| 11'b | Frame |
| 11'c | Vibro drive |
| 12 | Mold unit |
| 13 | Cavity |
| 14 | Lifting frame |
| 15 | Machine frame |
| 16 | Lifting drive |
| 21 | Hole |
| 21' | Nozzle bore |
| 31 | Duct wall |
| 31' | Nozzle bore |
| 32 | Nozzle |
| 32' | Nozzle |
| 33 | Fitting wall |
| 33' | Sliding surface on 3' |
| 34 | Nozzle |
| 35 | Nozzle |
| 36 | Nozzle |
| 37 | Nozzle |
| 38 | Distributor body |
| 41 | Duct wall |
| 41' | Duct wall |
| 42 | Valve |
| 42' | Valve |
| 43 | Seal |
| 43' | Sliding surface on 4' |
| 61 | Tube |
| 61a | Lower end |
| 62 | Piece of edible material |
| 63 | Tube |
| 63a | Lower end |
| 64 | Edible material paste |
| A | Distance |
| M | Castable mass |
| V | Volume |
| X | Axis |
| P1 | Pressure in 5 |
| P2 | Pressure in 6 |
| P0 | Pressure |

The invention claimed is:

1. A device for casting an edible product from a castable mass having:
a mass container for holding the castable mass; and
a metering unit having nozzles which have a fluidic connection to the interior of the mass container;
wherein the metering unit has, on the side facing away from the mass container, a nozzle block with a plurality of nozzles, and on the side facing the mass container has a valve block with a plurality of valves, wherein a metering chamber with a metering chamber volume which can be changed via a relative movement between the nozzle block and the valve block is delimited between the nozzle block and the valve block.

2. The device as claimed in claim 1, wherein the mass container volume has a fluidic connection to the metering chamber volume via the at least one valve in the valve block, wherein the valves are open in the direction pointing from the mass container to the metering chamber, and are closed in the direction pointing from the metering chamber to the mass container.

3. The device as claimed in claim 1, wherein the metering unit contains ducts which extend from the interior of the mass container to a respective nozzle of the metering unit.

4. The device as claimed in claim 1, wherein the metering unit forms part of the spatial delimitation of the mass container volume, and wherein the metering unit can be moved relative to the mass container.

5. The device as claimed in claims 1, wherein the nozzle has a nozzle opening whose flow cross section or opening cross section is flexible.

6. The device as claimed in claim 5, wherein the nozzle is elastic.

7. The device as claimed in claim 5, wherein the opening cross section of the nozzle opening can be controlled.

8. The device as claimed in claim 7, wherein the opening cross section of the nozzle opening can be controlled by pressure.

9. The device as claimed in claim 1, wherein vibro elements are arranged on or in the ducts.

10. The device as claimed in claim 1, wherein the nozzles of the nozzle block and the valves of the valve block are formed by identical elements.

11. The device as claimed in claim 1, wherein in each case a nozzle of the nozzle block and in each case a valve of the valve block are arranged along a respective virtual line which describes the relative movement between the nozzle block and the valve block.

12. The device as claimed in claim 1, wherein an elongate element which is assigned to the respective valve and the respective nozzle extends along the virtual line.

13. The device as claimed in claim 12, wherein the elongate element extends from the side of the mass container as far as the respective valve.

14. The device as claimed in claim 12, wherein the elongate element extends from the side of the mass container through the valve, and extends with its first end into the metering chamber.

15. The device as claimed in claim 12, wherein the elongate element extends from the side of the mass container through the valve, through the metering chamber and through the nozzle.

16. The device as claimed in claim 11, wherein the nozzles and the valves are composed of an elastic material.

17. The device as claimed in claim 16, wherein the nozzles and the valves extend in an annular shape around the line of the relative movement.

18. The device as claimed in claim 16, wherein the nozzles and the valves are embodied in the manner of a tab.

19. The device as claimed in claim 18, wherein the nozzles and the valves are embodied in the manner of a torus.

20. The device as claimed in claim 12, wherein the elongate element is a vibro element.

21. The device as claimed in claim 12, wherein the elongate element is a small tube.

22. The device as claimed in claim 21, wherein the second end of the small tube opens into a further container for holding a further edible product.

23. The device as claimed in claim 1, wherein said device is assigned a mold unit (12) with cavities or alveoli (13) into which the castable mass (M) can be poured.

24. The device as claimed in claim 23, wherein the mold unit is assigned a vibro element for vibrating the mold unit.

25. The device as claimed in claim 11, wherein a respective metering chamber with a metering chamber volume, which can be changed by a relative movement between the nozzle and the valve, is delimited between, in each case, a nozzle of the nozzle block and, in each case, a valve of the valve block.

26. The device as claimed in claim 25, wherein each metering chamber is assigned a temperature conditioning element.

27. A device for casting an edible product from a castable mass having:
- a mass container for holding the castable mass; and
- a metering unit having nozzles which have a fluidic connection to the interior of the mass container;
- wherein the metering unit has, on the side facing away from the mass container, a nozzle block with nozzles, and on the side facing the mass container has a valve block with at least one valve,
- wherein a metering chamber with a metering chamber volume which can be changed via a relative movement between the nozzle block and the valve block is delimited between the nozzle block and the valve block;
- wherein the nozzles of the nozzle block and the valves of the valve block are formed by identical elements.

28. A device for casting an edible product from a castable mass having:
- a mass container for holding the castable mass; and
- a metering unit having nozzles which have a fluidic connection to the interior of the mass container;
- wherein the metering unit has, on the side facing away from the mass container, a nozzle block with nozzles, and on the side facing the mass container has a valve block with at least one valve,
- wherein a metering chamber with a metering chamber volume which can be changed via a relative movement between the nozzle block and the valve block is delimited between the nozzle block and the valve block;
- wherein vibro elements are arranged on or in the ducts.

* * * * *